United States Patent [19]

Lau

[11] 4,066,108
[45] Jan. 3, 1978

[54] VALVE BAG FILLER, HANDLING AND SEALING SYSTEM

[75] Inventor: Erwin M. Lau, Dolton, Ill.

[73] Assignee: Black Products Company, Chicago, Ill.

[21] Appl. No.: 711,526

[22] Filed: Aug. 4, 1976

Related U.S. Application Data

[62] Division of Ser. No. 634,731, Nov. 24, 1975, Pat. No. 4,003,188.

[51] Int. Cl.² .............................................. B65B 1/18
[52] U.S. Cl. .................................................... 141/68
[58] Field of Search ..................... 53/187, 188, 126; 141/68, 90, 93, 285, 314, 315, 316, 392

[56] References Cited

U.S. PATENT DOCUMENTS

| | | | |
|---|---|---|---|
| 1,437,876 | 12/1922 | Tyler | 141/315 X |
| 2,715,004 | 8/1955 | Fox | 141/316 X |
| 3,384,134 | 5/1968 | Hillerns | 141/90 X |
| 3,785,410 | 1/1974 | Carter | 141/316 X |

*Primary Examiner*—Travis S. McGehee
*Attorney, Agent, or Firm*—Mason, Kolehmainen, Rathburn & Wyss

[57] ABSTRACT

In combination with sealable valve bags and a valve bag packer, a valve bag sealer comprising a bag transfer assembly for removing a filled valve bag from the filling tube of the packer and positioning the filled bag adjacent a sealing head assembly, said sealing head assembly including a pair of heated jaws for engaging the valve sleeve of said filled bag, a folding horn for inserting the valve sleeve between the jaws for closing the jaws to crimp and heat seal the valve sleeve and for opening the jaws after sealing is completed, a stuffing blade for stuffing the sealed valve sleeve of the bag into an adjacent pocket in the bag and means for releasing the sealed bag from the transfer assembly and moving the transfer assembly into a ready position in preparation for the next operating cycle.

5 Claims, 17 Drawing Figures

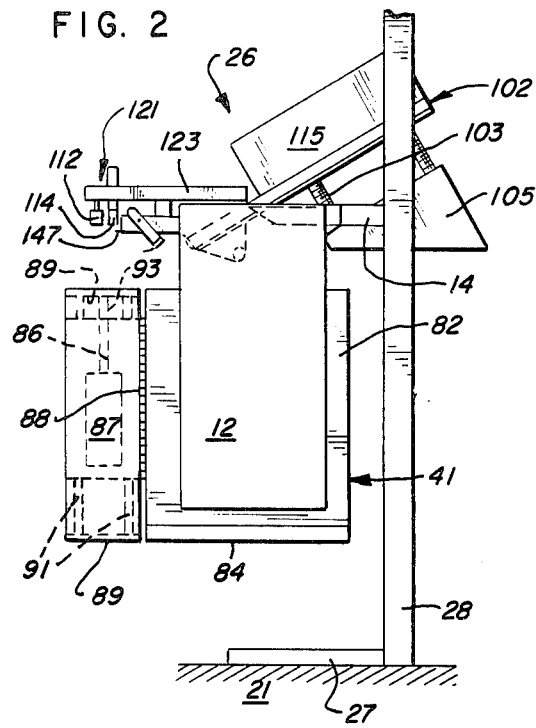
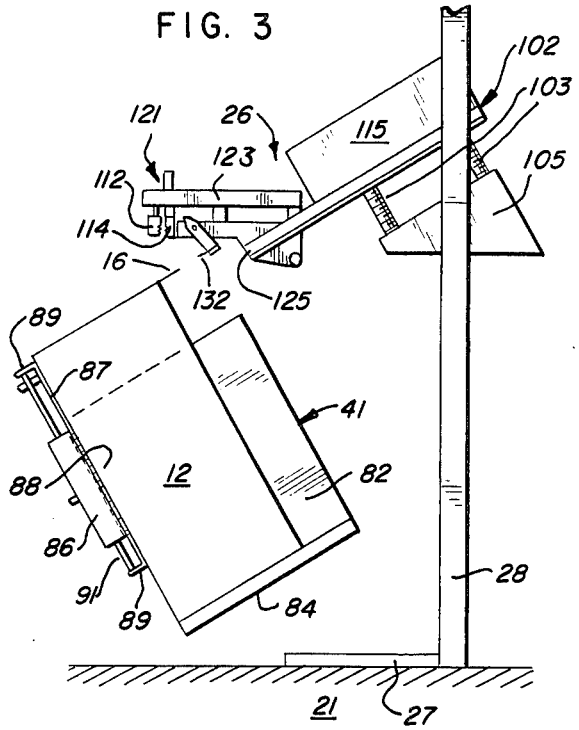
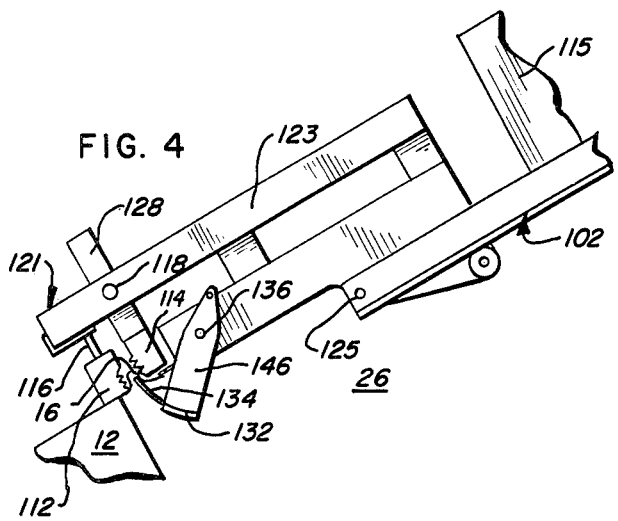
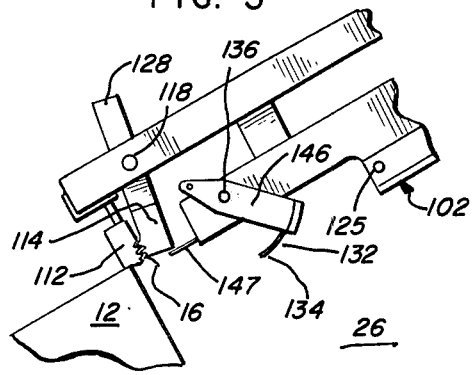
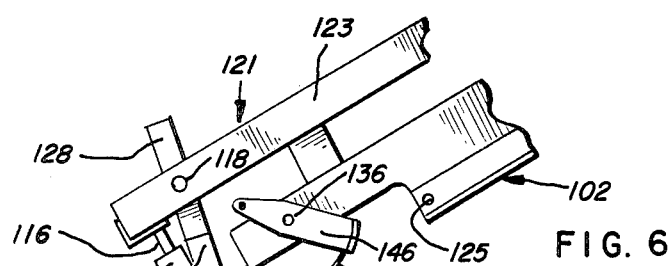

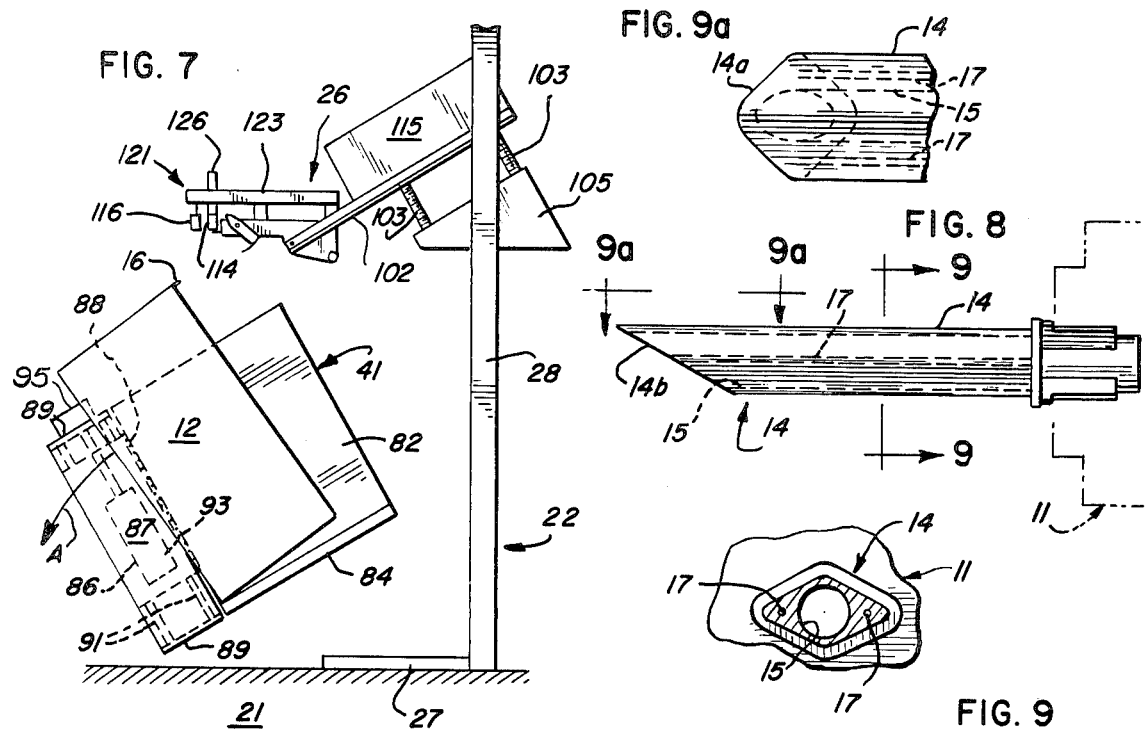
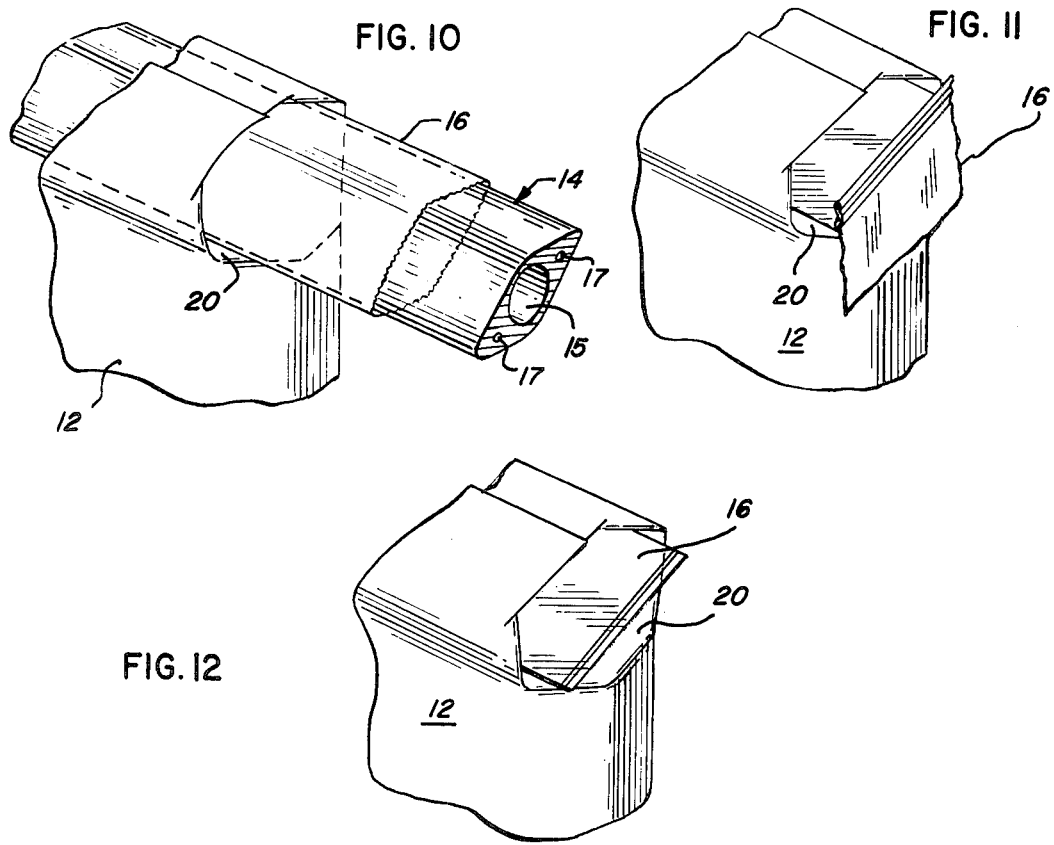

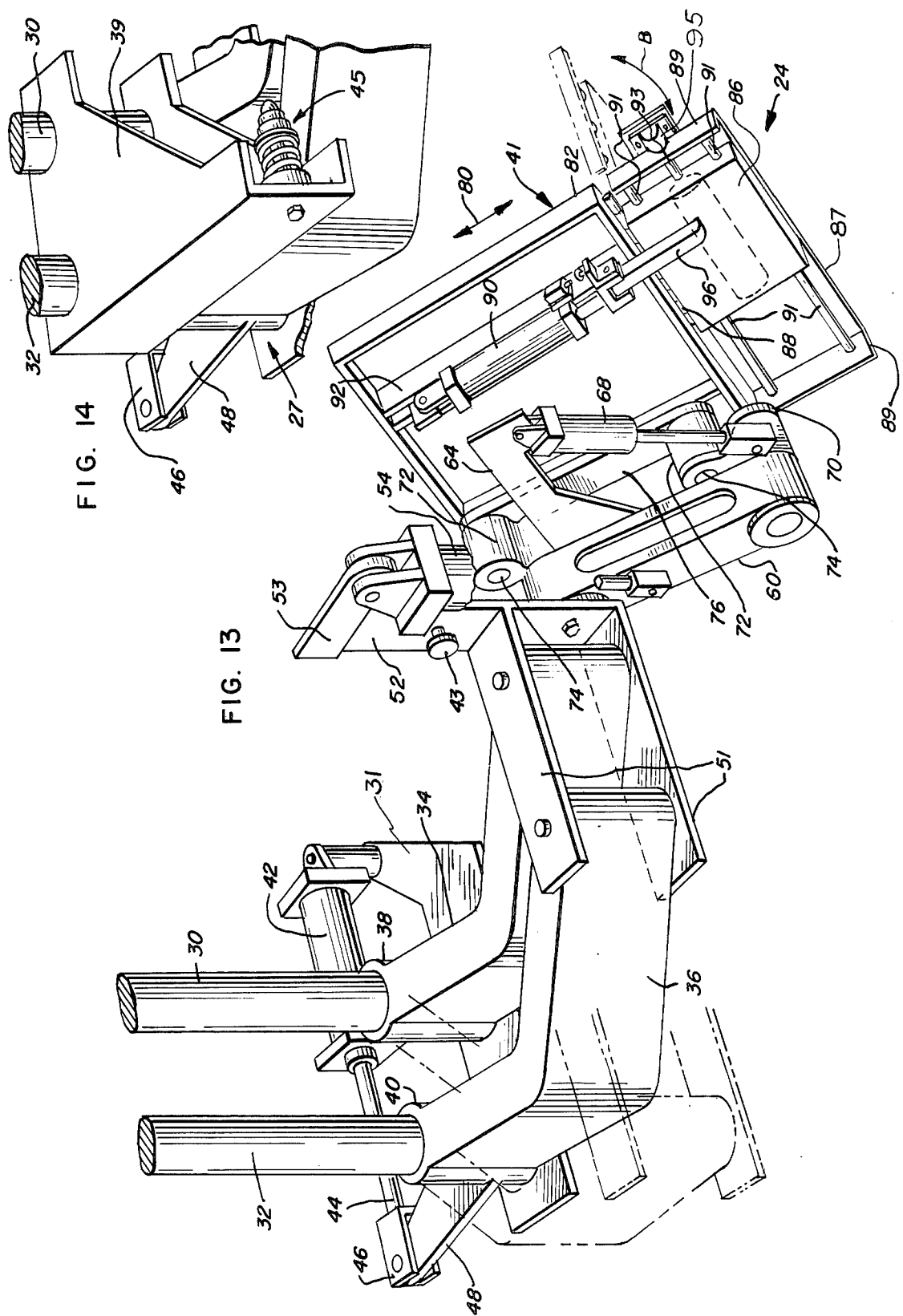

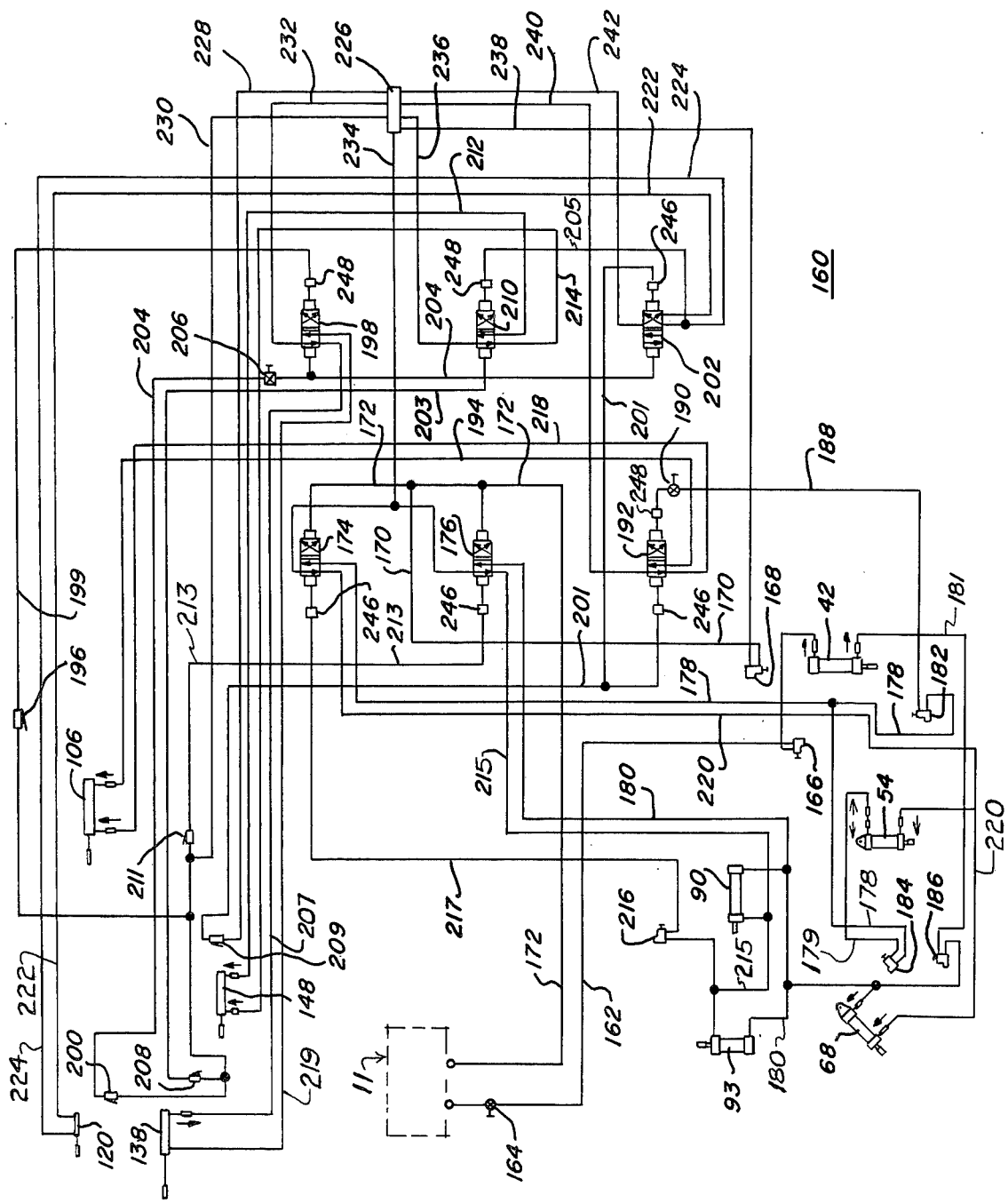

VALVE BAG FILLER, HANDLING AND SEALING SYSTEM

This is a division of copending application Ser. No. 624,731, filed Nov. 24, 1975, now U.S. Pat. No. 4,003,188.

BRIEF DESCRIPTION OF THE INVENTION

A. Field of the Invention

Many powdered and granular bulk products such as soy protein cereal, cement, sand, flour, seeds, grains and the like are packaged and transported in sealed multi-walled paper shipping sacks or bags for easy transportation from a processing plant to the ultimate user. To facilitate and speed the process an automatic valve bag packer such as that shown in U.S. Pat. No. 3,831,643 may be used in conjunction with multi-wall paper bags having a sealable, filling valve sleeve that communicates with the interior of the bag during the filling process. These bags are called valve bags. A metered weight of material is introduced into the bags from the filling tube of the valve bag packer and the sleeve valve of the bag is then closed and sealed. The valve sleeve on these bags is internally coated with a strip of heat sensitive, adhesive material for sealing of the bags after filling is completed.

B. Description of the Prior Art

A typical valve bag packer is described in U.S. Pat. No. 3,831,643 and includes a device for storage of the material such as a hopper, a valve for controlling the flow of material from the hopper to a filling tube, a scale for measuring the weight of material and means for controlling the flow in response to the scale. A valve bag packer typically employs a cylindrical or round cross-sectioned filling tube that is cantilevered from one end of a scale mechanism. The valve sleeve of a paper valve bag is inserted onto the open outer end of the filling tube which supports the bag as it is filled. The valve bag packer is operated to dispense a flow of material through the filling tube into the bag until the desired weight of material in the bag is obtained.

In accordance with the prior art, after a predetermined weight of material has been metered into the bag, the bag is manually removed from the filling tube and manually transferred to a sealing device where the valve sleeve is closed and the heat sensitive strip of material in the valve sleeve is melted and closed together to positively seal the bag. The sealed valve sleeve or flap is then manually stuffed or tucked into an adjacent pocket in the bag wall to protect the sealed sleeve valve from damage during further handling.

Prior art valve bag packers have cylindrical filling tubes of round or circular cross-section and these filling tubes have a number of disadvantages in that their cylindrical or circular shape is imparted to the valve sleeve of the bag which is supported on the filling tube during the filling process. The sleeves of the filled bags tends to retain a cylindrical or open shape after filling is complete and because of this, the valve sleeve is often difficult to insert into an elongated relatively narrow space between the jaws of heat sealing device. Moreover, a cylindrically shaped filling tube does not accurately fit the cross-section of the valve sleeve on the bag which tends to be somewhat flattened or elliptical in cross-section and some of the material flowing into the bag may leak out through the open spaces around the cylindrical tube within the elliptical valve sleeve during or after the filling process. In addition, after the filled bag is removed from the filling tube of the valve bag packer, some of the material may remain in the valve sleeve rather than settling into the main body of the bag and this prevents or greatly hinders good sealing of the valve bag sleeve.

The manual procedure of removing a heavy, filled bag from the filling tube of the valve bag packer and moving the filled bag into position adjacent a heat sealing device requires a strong back. Often times material spillage occurs during this handling and some material may become airborne and flow out the open valve sleeve which tends to retain the cylindrical shape of the filling tube until sealed. The subsequent procedure of manually stuffing the sealed bag sleeve flap into the adjacent pocket of the bag requires an additional time consuming manual labor step.

SUMMARY OF THE INVENTION

The present invention relates to a valve bag filling, handling and sealing system to be used in combination with a sealable valve bags and including an automatic valve bag packer. The system eliminates the laborious manual procedures described of removing the heavy filled valve bags from the filling tube of the valve bag packer, positioning the filled valve bag adjacent a heat sealing device and finally stuffing the sealed valve sleeve into the adjacent pocket of the bag.

The present invention includes a new and improved valve bag packer with a novel filling tube for filling valve bags which eliminates many of the difficulties of the present prior art cylindrically shaped filling tubes.

The present invention includes a novel bag handling and sealing apparatus for handling filled bags after the filling process is completed on the valve bag packer.

It is an object of the present invention to provide and new and improved valve bag sealing and handling apparatus for use in combination with sealable valve bags and valve bag packers.

It is another object of the present invention to provide a new and improved valve bag packer, and more particularly a valve bag packer of the character described having a new and improved filling tube design.

Another object of the present invention is to provide a new and improved apparatus for automatically removing a filled valve bag from the filling tube of a valve bag packer and thereafter closing and sealing the valve sleeve of the bag.

Another object of the present invention is to provide a new and improved apparatus for handling and sealing filled valve bags of the character described which eliminates or greatly reduces the amount of manual labor required and which eliminates or greatly reduces the chance of any substantial material leakage from a filled bag during the handling of the bag before sealing of the valve sleeve is completed.

Other objects of the present invention are to reduce or eliminate the manual procedures necessary in filling, handling, and sealing a multi-walled paper sealable valve bag, to provide valve bag packer having a new and more efficient filling tube for filling bags, and generally to reduce the labor costs and expense in filling, handling and sealing multi-walled valve bags.

Briefly, the valve bag sealing and handling apparatus of the present invention includes a frame or base adapted to be secured in position adjacent a valve bag packer which may be of the type described in U.S. Pat. No. 3,831,643 utilized for the automatic filling of multi-walled sealable valve bags and the like. The frame supports a bag transfer means operable to remove a filled bag from the filling tube of the valve bag packer and thereafter position the filled bag adjacent a sealing head wherein the valve sleeve is closed and heat sealed. The sealed sleeve is then automatically stuffed into an adjacent pocket in the bag to prevent possible damage or inadvertent opening during shipment, etc.

The bag transfer means is movably supported from the frame and is actuated by fluid cylinders to move between a ready position, on one side of the valve bag pocket (as a bag is being filled on the filling tube) and a pick up position aligned with the filling tube wherein the mechanism is operable for removing the filled bag from the filling tube after the filling cycle has been completed. To pick up a filled bag, the transfer means moves beneath the bag which is hanging on the filling tube and then moves upwardly while rocking or tilting the bag to lift and slide the bag off the outer end of the filling tube. The transfer means then carries the filled bag laterally into position beneath a sealing head and during this phase the bag is vibrated to cause any material remaining in the valve bag sleeve to fall down into the main body of the bag. The sealing head includes a pair of electrically heated jaws for crimping and heat sealing the valve bag sleeve which is inserted into folded configuration between the open jaws by a folding horn. The folding horn is then removed after the jaws are closed and melting of the heat sensitive adhesive coating on the inside of the valve bag sleeve takes place. During the predetermined time that the sealing jaws are closed, a stuffer plate is actuated to stuff or tuck in the sealed valve sleeve flap into an adjacent pocket of the bag. After the stuffer plate completes a cycle including a stuffing and a return stroke and is returned to its ready position, the sealing jaws are opened to release the sealed sleeve.

Thereafter, the sealed bag is released allowing the bag to drop onto the floor, a truck, a pallet or an adjacent conveyor belt or the like and the bag transfer means is then readied in preparation for the next operating cycle.

In accordance with the present invention, a new and improved valve bag packer having a novel filling tube is provided and is operable to reduce or eliminate the spillage of material from the valve bags during or after filling. The valve bag packer provides for better closing and sealing of the valve sleeve of the bags. The filling tube of the packer is formed with a flat, somewhat elliptically shaped cross-section which tends to allow a valve bag sleeve to naturally flatten out after the bag is removed from the filling tube and there is little tendency for the sleeve to remain open or round as with round filling tubes. Besides providing a closer fit between the valve sleeve of the bag and the filling tube, the filling tube also provides a wider base for supporting the bag and its contents during the filling process. After removal of a filled bag from the filling tube the flattened cross-section of the valve sleeve tends to retain less material than a rounded sleeve and also tends to close up naturally so that airborne material is not given a change to leak out as the bag is being tilted, vibrated and prepared for final sealing of the valve sleeve. The material is conveyed through a circular conduit in the filling tube and one or more vacuum lines are provided at the side of the filling conduit to keep the valve free of material during and after filling.

BRIEF DESCRIPTION OF THE DRAWINGS

In order to better understand the present invention, reference should be had to the following detailed description, claims and drawings in which:

FIG. 2 is a side elevational view of the apparatus with the bag transfer means in a ready position;

FIG. 3 is a side elevational view of the apparatus with the bag transfer means in position for supporting a filled bag for heat sealing;

FIG. 4 is a fragmentary side elevational view of the sealing head of the present apparatus with the sealing jaws and folding from one of the operative positions;

FIG. 5 is a fragmentary side elevational view similar to FIG. 4 but showing the sealing jaws in a closed position for heat sealing with the folding horn retracted;

FIG. 6 is a fragmentary elevational view similar to FIG. 4 but illustrating the tucking blade as it is tucking the sealed valve sleeve into the bag pocket;

FIG. 7 is a side elevational view of the apparatus similar to FIG. 2 but showing the bag transfer means in a position releasing a sealed bag;

FIG. 8 is a side elevational view of a new and improved valve bag packer having a novel filling tube constructed in accordance with the features of the present invention;

FIG. 9 is a cross-sectional view taken along line 9—9 of FIG. 8;

FIG. 9a is a fragmentary top plan view of the outer end portion of the filling tube.

FIG. 10 is a fragmentary perspective view of the upper corner portion of a typical valve bag shown as it is mounted in filling position of the filling tube as in FIGS. 8 and 9;

FIG. 11 is a fragmentary perspective view of a valve bag after its valve sleeve has been sealed by the apparatus of the present invention;

FIG. 12 is a fragmentary perspective view of the bag of FIG. 11 but with the sealed valve sleeve tucked into the bag pocket;

FIG. 13 is a fragmentary side elevational perspective view of a lower portion of the apparatus of FIG. 1 taken from an opposite side;

FIG. 14 is a fragmentary side elevational perspective view of another lower portion of the apparatus similar to FIG. 13;

FIG. 16 is a schematic diagram of the pneumatic system of the bag filling, handling and sealing apparatus of the present invention.

DETAILED DESCRIPTION OF THE INVENTION

Figure 1:
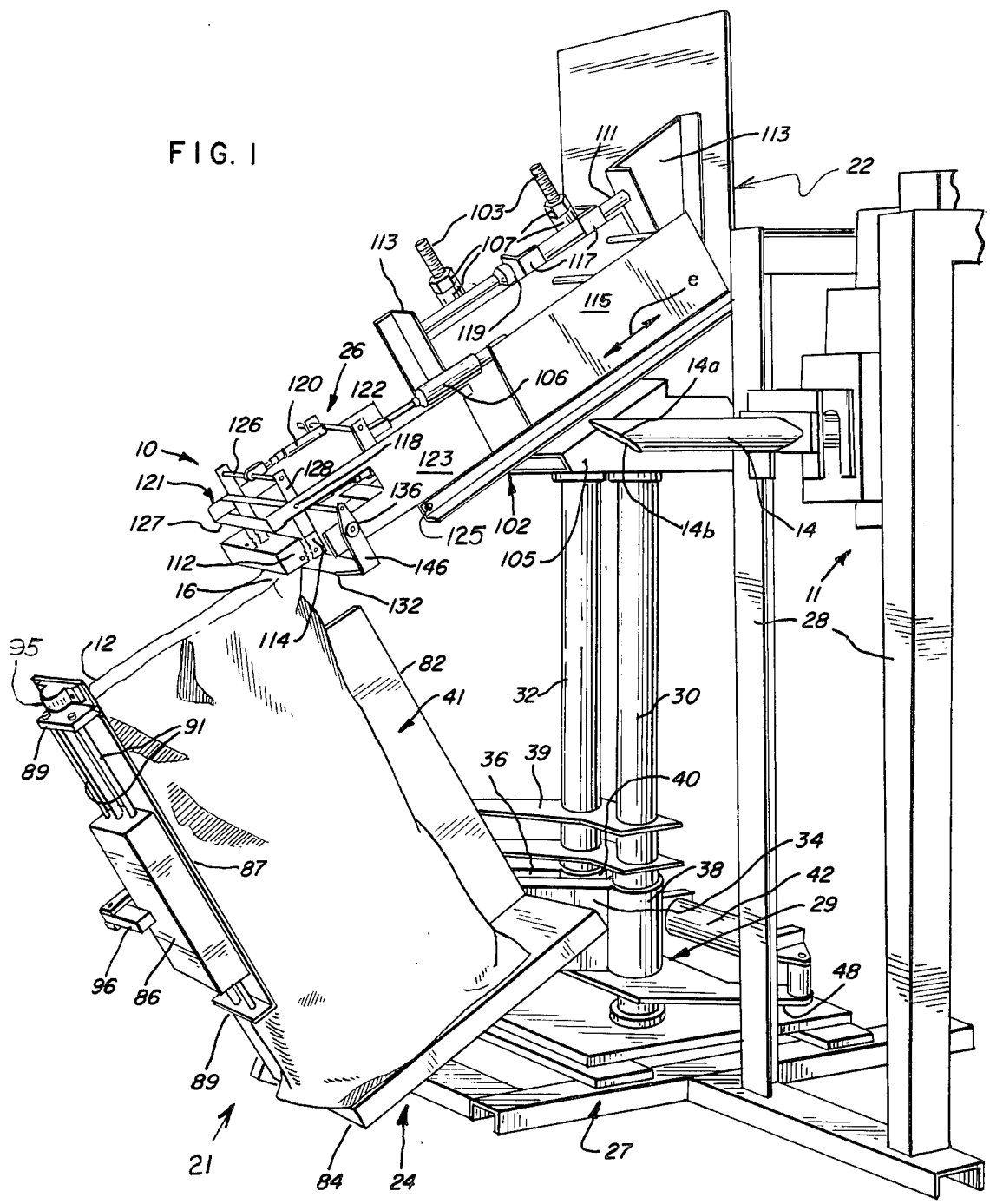
FIG. 1 is a front perspective view of a valve bag filling, handling and sealing system in accordance with the features of the present invention.

The present invention is directed to a new and improved valve bag filling, handling and sealing system generally indicated by the reference number 10 (FIG. 1) and especially adapted for sealing the valve sleeve 16 of multi-wall paper bags 12 (hereinafter referred to as valve bags) as are commonly used for powdered or granular bulk material such as feeds, seeds, grains, flour, cement, etc. The system 10 includes an automatic valve bag packer 11 of the type such as shown and described in U.S. Pat. No. 3,831,643 and in Product Bulletins Nos.

102 and 110 of the Black Products Company, Chicago, Ill. which patent and bulletins are incorporated herein by reference.

VALVE BAG PACKER AND FILLING TUBE

Prior art valve bag packers have employed a filling tube of circular cross-section for use with valve bags 12 of the type shown in FIGS. 10–12. These prior art filling tubes do not match the elliptical or flattened cross-section of the sealable filling sleeve 16 of the bags and material often leaks out through the open spaces formed on either side of the circular filling tube and the elliptically shaped sleeve of the bags.

The integral filling sleeve 16 (FIG. 10) of the bag forms a conduit for the flowing material and normally the sleeve is made of the same material such as paper as the main body of the bag. As is known in the art, a portion on the interior surface of the valve sleeve 16 is coated with a strip of heat sensitive adhesive material so that opposite walls of the valve sleeve may be crimped together and adhesively secured to positively seal or close the filling sleeve of a filled bag.

During a bag filling operation, the valve sleeve of a bag is inserted onto the outer end portion of the filling tube 14 of the valve bag packer 11. The packer is then put into operation and the material is dispersed out of the packer through the filling tube and the filling sleeve of the bag into the interior of the bag until the desired weight of material has been delivered as measured by the scale of the valve bag packer.

In accordance with an important feature of the present invention, the new and improved filling tube 14 has an elliptical cross-section (FIG. 9) which more naturally matches the flattened out cross-section of the valve sleeve 16 of a typical valve bag 12. Because of the cross-sectional shapes of the filling tube and the bag sleeve closely conform to one another, there is little, if any, open space between the inside surface of the bag filling sleeve and the outer surface of the filling tube 14 when a bag is placed on the tube for filling. Because the elliptical cross-section of the filling tube 14 more closely fits the inside wall surface of the valve sleeve 16 than does a round filling tube any vortex effect created by material flowing through the outer end of the filling tube into the bag is diminished or eliminated and consequently leakage of material is reduced during a filling operation.

After a bag is filled and removed from the filling tube 14, the valve sleeve 16 tends to flatten out rather than retain a round cross-section and the flattened shape is more easily collapsible for subsequent folding, sealing and stuffing into an adjacent recess or pocket 20 (FIG. 12) in the bag. Moreover, because of the elliptical shape, the valve sleeve 16 is less likely to hold or retain material upon removal from the filling tube 14 and this reduces the chance of an imperfect seal later on. Referring to FIGS. 9 and 9a, the nose or outer end of the filling tube is rounded off as shown and the bottom surface 14b of the outer end slopes downwardly and inwardly to facilitate the placement of a bag on the filling tube for filling. As shown in FIGS. 9 and 10, the filling tube includes a central flow passage or conduit 15 of circular cross-section flanked on opposite sides by a pair of smaller size vacuum passages 17. All of the passages are open at the outer end surface 14b of the filling tube and the vacuum passages are connected to a suitable source of vacuum or suction in the valve bag packer 11 in order to continuously clean out any airborne material from the bag or filling sleeve during the filling operation and while the filled bag is being removed from the filling tube. This arrangement insures that the filling sleeve of the bags is free of material so that a positive heat seal can be perfected every time.

In prior art devices employing a cylindrical or a circular cross-sectioned filling tube, open spaces are formed on opposite sides of the tube between the outer periphery of the tube and the adjacent inner wall surface of the valve sleeve. As the material flows into a bag, a vortex is created by the action of the material moving through the outlet end of the filling tube and this vortex action sometimes causes the material to flow back in the open spaces. This material often remains in the open spaces of the filling sleeve after filling is completed and interferes with good sealing of the valve sleeve. The filling tube 14 eliminates these difficulties and results in much better sealing operations.

THE VALVE BAG HANDLING AND SEALING APPARATUS

The system includes a valve bag sealing apparatus generally indicated by the number 21 having a frame 22, a bag transfer assembly 24 and a sealing head 26. The frame includes a base 27 and a pair of upright columns 30 and 32 for supporting the sealing head 26. The bag transfer assembly 24 includes a carriage 29 supported on the pair of cylindrical columns 30 and 32 (FIG. 13) extending upwardly of the base structure 27. The bag transfer carriage includes a pair of arms 34 and 36 mounted on the columns for pivotal movement about integral cylindrical bosses 38 and 40. The arms support a bag holding chair 41 for movement between a first or ready position to a second position. In the ready position a base 84 of the chair is laterally offset to one side of the bag filling position of the filling tube 14 (FIG. 2) of the valve bag packer 11 and the chair is beneath the sealing head 26. In the second or pre-pick up position wherein the chair base is centered directly beneath a filling bag on the filling tube rotational movement of the arms 34 and 36 is produced by a lateral transfer cylinder 42 having one end connected to a bracket 31 and a piston rod 44 with a clevis 46 at the other end secured to a bracket 48 integral with base 40 of the arm 36. Outer ends of the arms 34 and 36 are interconnected by members 51 so that the arms move in parallel as they rotate beneath the ready and pick up positions.

The bag support chair 41 includes an upright side wall 82 at right angles to the base or floor wall 84 and these walls support the bags in a generally upright position generally leaning against the side wal. The chair also includes an end wall or door 86 pivotally connected to the outer edge of the side wall with a piano type hinge 88.

With the door or end wall closed, (FIGS. 1 and 3) the door provides support for the bags during the bag pick up cycle and while the sealing head is closing and sealing the sleeve valve 16. After sealing is completed, the door is opened (arrow B-FIG. 13) and aligns with the side wall 82. When this occurs, a sealed bag 12 is free to fall from the tilted chair as shown by the arrow A in FIG. 7.

The door is operated by a door cylinder 90 (FIG. 13) secured to the back of the side wall 82 on a bracket 92 and the rod end of the cylinder is pivotally connected to an arm 96 secured to the outside surface of the door. Upon extension of the piston rod, the door is moved to the closed position at right angles to the side wall 82

(FIG. 1 and FIG. 13 dotted lines) and upon contraction of the piston rod into the cylinder the door is opened (FIG. 2 and FIG. 13 solid lines). As best shown in FIG. 1, the door 86 includes a reciprocally movable face plate 87 having flange 89 along upper and lower edges connected to a plurality of rods 91 that pass through the door body. Mounted within the body of the door is a pneumatic cylinder 93 which is operable to raise or lower the face plate 87 between an upper position for supporting a bag when the chair is tilted (FIGS. 1 and 3) and a lower position for clearing the underside of the sealing head 26 when the chair is in the ready position (FIG. 2).

In order to shake down any material which might possibly remain in the valve sleeve 16 of a filled bag 12 that is picked up by the chair 41, a pneumatic vibrator 95 is mounted on the face plate 87 and the vibration imparted to the bags carried in the chair shakes down any material remaining in the sleeve into the interior of the bags.

After the bag filling cycle is completed and the filled bag is hanging in position on the filling tube 14 ready for pick up, the bag transfer assembly 24 is activated and the bag chair 41 moves upwardly until the chair floor or base 84 engages the bottom of the bag causing it to be lifted slightly off of the filling tube 14, after which, the chair is rocked or tilted outwardly so that the filling sleeve 16 of the filled bag moves smoothly off the outer end of the filling tube 14 of the valve bag packer 11. As previously indicated, the outer ends of the carriage arms 34 and 36 are interconnected by a pair of upper and lower brackets 51 so that the arms move in parallel from the ready position (dotted lines-FIG. 13) to the pre-pick up and pick up position (solid lines). As viewed in FIG. 13, the outer ends of the bracket 51 interconnecting the arms are connected to a vertical column structure 52 having an outwardly extending arm 53 which supports the upper end of a chair or carriage tilt cylinder 54. The rod end of the tilt cylinder is pivotally interconnected to a support arm 60 having its inner end supported from the upright 52 adjacent the lower end thereof by means of a pivot axle (not shown). When the piston rod of the chair tilt cylinder 54 is extended, the outer end of the support arm 60 is pivoted downwardly to rock the bag chair 41 into a tilted position as shown in FIGS. 1 and 3. Contraction of the rod into the cylinder 54, returns the chair to the upright or vertical position as shown in FIG. 2, wherein the base or floor 84 of the chair is horizontal. The carriage includes a bag lift cylinder 68 having an upper end pivotally interconnected to a bracket 64 secured to the support arm 60 intermediate its ends. The lower end of the piston rod of the bag lift cylinder is pivotally interconnected to a lug or ear 70 on the outer one of a pair of relatively short pivot arm assemblies 72, each having a lower end pivotally connected to the support arm 60 and an upper end secured to a pivot axle 74 extending outwardly from a bracket 76 mounted on the back surface of the bag chair side wall 82. When the bag lift cylinder 68 is extended, the bag chair 41 is pivoted upwardly relative to the support arm 60 and when the bag chair 41 tilt cylinder 54 is extended or contracted, the support arm 60, itself is pivoted relative to the upright structure 52 supported from the outer ends of the lateral transfer arms 34 and 36 of the carriage 29.

From the foregoing it will be seen that the lateral transfer carriage of the bag transfer assembly 24 is movable in a horizontal direction by extending or contracting the lateral transfer cylinder 42 to move the arms 34 and 36 about their supporting columns 30 and 32 respectively. In addition, the chair 41 is rockable about a horizontal axis between a position wherein the floor is horizontal (FIG. 2) and a tilted position (FIG. 3) wherein the floor is aligned at approximately a 30° angle to the horizontal by means of the bag tilt cylinder 54. The transfer chair 41 is also movable relative to the pivotable support arm 60 in order to smoothly tilt a bag on the filling tube and slide the valve sleeve 16 of the bag away from the outer end of the tube.

As shown in FIG. 14, in order to cushion the end of a stroke, as the bag chair 41 is moved from the pick up position with a filled bag in place into the laterally offset position ready for sealing by the sealing head 26, there is provided a bracket 39 carried on the vertical posts 30 and 32 having a shock absorber assembly 45 engagable with a button 43 mounted on the upright structural member 52 of the chair supporting carriage. Because the chair is relatively heavy and a filled bag adds considerably to the momentum thereof, it is desirable to cushion the end of the stroke with a shock absorber in order to limit stress on the mechanism and the lateral transfer cylinder 42.

SEALING HEAD

In accordance with the present invention, the valve bag sealing head 26 serves to crimp and heat seal the filling valve sleeves 16 of the filled valve bags 12 and thereafter tuck or stuff the sealed sleeves into the adjacent pocket 20 of the bags. The sealing head is supported from the top of columns 30 and 32 of the apparatus and includes an inner base or frame 102 adjustably supported from threaded rods 103 projecting upwardly from a base or bracket 105 fixedly attached to columns 30 and 32. Precise angular adjustment of the base 102 is achieved by adjusting the position of lock nuts 107 on the threaded rods 103 (FIG. 1). The position of a pair of heated sealing jaws 112 and 114 is adjustable toward and away from the supporting columns 30 and 32 by means of another threaded rod assembly 111 extending between a pair of brackets 113 and interconnecting a carriage 115 adjustable longitudinally on the rod 111 as indicated by the arrow "C" in FIG. 1. A pair of brackets 117 connected to one side of the base 102 are provided and the threaded rod 111 passes through these brackets so that the position of the frame may be precisely adjusted and then fixed by means of nuts 119 on the rod.

Figure 15:
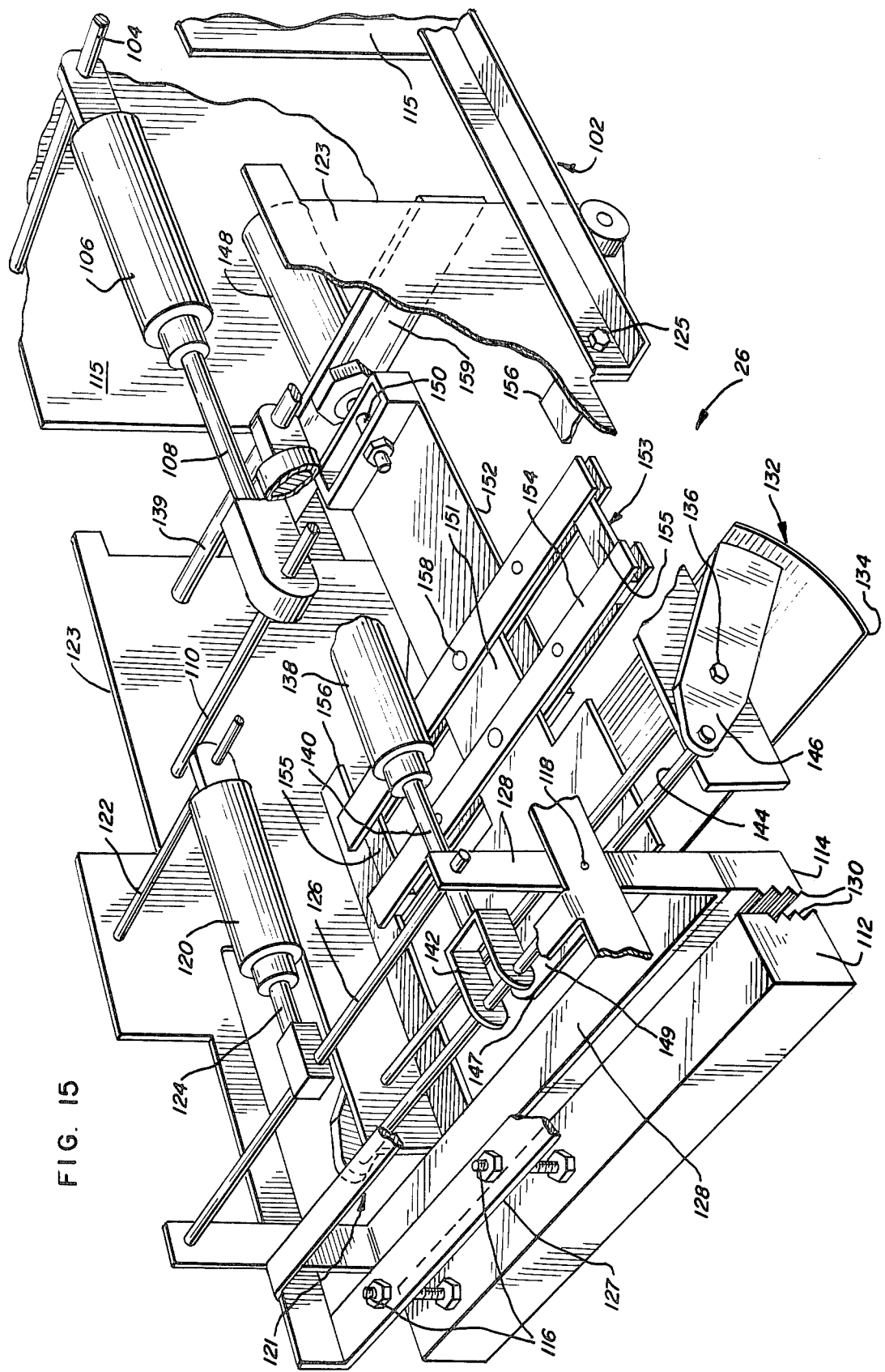
FIG. 15 is a fragmentary elevational perspective view of the sealing head of the apparatus constructed in accordance with the features of the present invention.

The sealing head 26 includes an outer frame structure 121 having a pair of side opposite members 123 pivotally interconnected to a pair of outwardly extending side angles of the inner sealing head frame 102 by means of pivot axles 125 (FIG. 15). The outer frame 121 is movable between a horizontal position (FIGS. 2, 3 and 7) and a downwardly tilted position as shown in FIGS. 1, 4, 5 and 6 for heat sealing the filling valve sleeve 16 of a bag held in place beneath the head on the bag chair 41. For the purpose of moving the outer frame 121 of the sealing head between the horizontal and the downwardly tilted position, the sealing head includes a head tilt cylinder 106 having one end pivotally interconnected to a rod 104 extending between the opposite side of the inner frame 102. The head tilting cylinder includes a piston rod 108 having a connector on its outer end pivotally interconnected with a cross-rod 110 extending between side frames 123 of the outer frame structure 121. When the piston rod is contracted into the tilt cylinder 106, the outer frame of the sealing head is moved to the horizontal position and when the rod is extended from the cylinder, the outer frame is tilted downwardly into position for sealing the valve sleeve of a bag.

The outer frame 121 includes a cross member 127 at the outer end for supporting the heated jaw 112 which is adjustably secured in position on the cross member 127 by mounting bolts 116 (as best shown in FIG. 15). The movable jaw 114 is mounted on the lower cross portion of the U-shaped bracket 128 which is supported on the inside of the side frames 123 and is pivotally interconnected to the side frames by the pivot bolts 118. The fixed and movable jaws 112 and 114 respectively, have matching serrated faces 130 adapted to crimp and heat seal the filling valve sleeve 16 of the valve bags and the jaws are electrically heated to a desired temperature thermostatically controlled for the particular adhesive used.

In order to open and close the jaws to effect the crimping and heat sealing action, as shown in FIGS. 4, 5 and 6, a jaw control cylinder 120 is mounted with a rearward end supported from a cross member 122 extending between the side frames 123. The jaw cylinder includes a piston rod pivotally interconnected to a cross member 126 connected between upper ends of the upright legs of the U-shaped jaw support bracket 128 which carries the movable jaw 114.

Referring now to FIGS. 2, 3, 4, 5 and 6, after a bag is picked up from the filling tube 14 by the bag chair 41 of the bag transfer assembly 24 and moved laterally by the lateral transfer carriage 20 into a position as shown in FIG. 3 with the bag chair tilted so that the filling sleeve 16 extends upwardly as shown toward the sealing head, the sealing head is then activated so that the outer frame structure 121 is pivoted to the downwardly tilted position of FIG. 4. When this occurs, the filling sleeve of the bag 16 lies directly beneath the open jaws 112 and 114 and generally parallel to their lower edges. The sealing head is provided with a curved folding horn 132 having a leading edge 134 adapted to penetrate upwardly between the open jaws and positioned to just clear the serrations 130 on the fixed jaw. The folding horn is supported from the side frames 123 by means of legs 146 pivotally connected by pivot axles 136. The upper ends of the support legs 146 are interconnected by a cross member 114 which in turn is connected to a clevis 142 on the outer end of the rod 140 of a folding horn control cylinder 138. The rear end of the folding horn cylinder is pivotally supported by a cross member 139 extending between the side frames 123 of the outer frame assembly 121. When the piston rod 140 is contracted into the folding horn cylinder 138, the folding horn 132 is pivoted in a clockwise direction as shown in FIG. 4, causing the bag filling sleeve 16 of the filled bag to be pushed upwardly and folded between the open sealing head jaws 112 and 114 as shown in FIG. 4. The jaw control cylinder 120 is then activated to close the jaws and squeeze the folded bag sleeve on opposite sides of the leading edge portion 134 of the folding horn. While the jaws are exerting pressure on the folded bag filling sleeve and the folding horn, the horn is retracted by counterclockwise movement as shown in FIG. 5 and this pressure retains the folded valve sleeve between the jaws as they move to fully close against the bag sleeves when the horn is withdrawn. The jaws remain closed for the desired selected period of time to crimp and effect a heat seal on the adhesive in filling valve sleeve 16 of the valve bags 12.

After the fold and heat seal has been effected as shown in FIG. 11 and in order to prevent damage to the sealed valve sleeves during further handling of the bags, the sealing head 26 is provided with a stuffer blade 147 as best shown in FIGS. 5, 6 and 15. The stuffer plate includes a leading edge 149 (FIG. 15) having rounded corners and is adapted to advance against the downwardly extended portion of a sealed valve sleeve and tuck or stuff the valve sleeve into the pocket 20 closely adjacent and underneath the sleeve as best shown in FIGS. 10, 11 and 12. The stuffer blade includes a tongue or body 151 pivotally secured to a carriage 153 which is guided for sliding reciprocal movement along guide rails 156 on the inside surface of the sides 123 of the frame 121 as best shown in FIG. 15. The tongue 151 is removably attached to the carriage by means of a pivot bolt 158 and several tongues may be provided having different widths suitable for use with different width bags. These tongues are readily installed or placed by removing the pivot bolt 158. The tongue carriage 153 comprises pairs of forward and rearward slide bars and these bars are interconnected on adjacent opposite ends by short members 155 which ride against the guide rails 156 on the frame structure. Reciprocal movement of the carriage is accomplished by means of a pusher 152 interconnected to the piston rod 150 of a stuffing cylinder 148 secured to the outer frame structure at its forward end on a cross member 159. After the sealed valve sleeve 16 is inserted into the pocket 20 of the valve bag by advancing movement of the leading edge 149 of the stuffer blade 147, the rod of the stuffer cylinder 148 is contracted to withdraw the stuffer blade. After the sealing and sleeve stuffing operation is completed, the sealing head 123 returns to its horizontal position. The chair door cylinder 90 is actuated to open the door 86 of the bag chair 41 and the finished sealed bag 12 is discharged by gravity and drops out of the chair as indicated by the arrow "A" in FIG. 7 onto a suitable conveyor or the floor. After the bag has been discharged, the bag chair 41 is returned to the ready position as shown in FIG. 2 awaiting the completion of filling of the next bag which has been placed on the filling tube 14. After the filling cycle has been completed as described, the bag handling and sealing apparatus is activated to run through another complete operating cycle which can take as little as nine seconds in one embodiment as tested.

FIG. 16 illustrates a pneumatic system for the valve bag handler and sealer apparatus and is indicated generally by the reference number 160. An air conduit 162 is interconnected between the valve bag packer 11 and the bag handling and sealing apparatus 21 through a manual shut-off valve 164. A signal from the packer passes through shut-off valve 164 through the conduit 162 to a button valve 166 which is actuated when the chair 41 is in a lower horizontal position. The signal through button pilot valve 166 operates to expand the carriage transfer cylinder 42, and therefore, move the bag chair 41 into the pre-pick up position directly beneath a bag 12 on the filling tube 14 of the valve bag packer 11. A button pilot valve 168 is activated when the carriage is in place under a filled bag. The signal from button valve 168 is sent through a conduit 170 to activate a pair of pneumatically actuated four-way valves 174 and 176. The conduit 170 joins a conduit 172 which carries the signal from the button pilot valve 168 to the valve bag packer 11, causing a reset in the controls of the packer. When the valves 174 and 176 are activated, fluid is delivered by a conduit 178, to the button pilot valves 182 and 184, and at the same time fluid is also delivered by a conduit 180, to the expansion side of the fluid cylinders 68, 90 and 93 and to a button pilot valve 186. As previously described, when the cylinders 90 and 93 are activated to expand their piston rods outwardly, the chair door 86 is closed and the chair door panel 87 is elevated to its upward position. The bag lift cylinder 68 is extended in length causing the chair to be elevated on the arm 60 while still maintaining a horizontal position because of the eccentric arrangement of the linkages 72 and axle 74 interconnecting the support arms 60 and the bracket 76 on the backside of the chair sidewall 82. A button pilot valve 184 is activated when chair 41 is elevated. This valve 184 sends fluid through a conduit 179 to the expansion side of the cylinder 54. As previously described, when the cylinder 54 is activated to expand its piston rod outwardly, the chair 41 is rocked or tilted outwardly so that the filled bag 12 is removed from the filling tube 14 of the packer 11.

A button pilot valve 186 is activated when the chair 41 is rocked or tilted outwardly. This valve 186 sends fluid through a conduit 181 to the retract side of the cylinder 42. When the lateral transfer carriage cylinder 42 is activated to retract its piston rod, it causes the bag chair 41 to move laterally back toward a position under the sealing head 26 with the filled bag 12 thereon. A button pilot valve 182 is activated when the chair 41 is returned under the sealing head 26. This pilot valve 182 sends a signal through a conduit 188 and through a shut-off valve 190 to activate a four-way valve 192. When the four-way valve 192 is activated, fluid is supplied by a conduit 194 to the expansion side of the head tilt cylinder 106. This causes the sealing head outer frame structure 121 to be tilted downwardly into the position shown in FIGS. 1, 4, 5, and 6, ready for operation to seal the filling sleeve 16 of a valve bag. A lever trigger valve 196 is activated for supplying fluid to actuate another four-way valve 198 via a conduit 199. Actuation of the valve 198 supplies pressurized fluid via a conduit 219 to contract the folding horn cylinder 138 and cause the leading edge 134 of the folding horn to fold the filling sleeve 16 up between the open jaws 112 and 114 ready for sealing.

When the folding horn is in position between the open jaws 112 and 114, another lever trigger valve 200 is activated and supplies fluid through a conduit 204 and manual valve 206 to activate a four-way valve 202 and return the four-way valve 198. Activation of the four-way valve 202 delivers fluid through a conduit 224 to retract the jaw cylinder 120. Retraction of the jaw cylinder 120 clamps the heated jaw 114 against the folded bag valve sleeve 16, folding horn 134 and the heated jaw 112. The four-way valve 202 also sends a signal through a conduit 205 to activate a four-way valve 210.

The returning valve 198 delivers fluid through a conduit 207 to extend the rod of the folding horn control cylinder 138 and accordingly as the filling sleeve 16 is held in the folded position between heated jaws 112 and 114, the folding hron is retracted from between the closed jaws and the folded valve sleeve 16. Activation of the four-way valve 210 supplies fluid through a conduit 212 to expand the stuffer cylinder 148 and urge the stuffer blade 147 to stuff or tuck-in the flap of the sealed valve sleeve 16 into the adjacent pocket 20 in the valve bag.

After the stuffing or tucking step is completed, a lever pilot valve 208 is activated and sends a signal through conduit 203 to return the four-way valve 210. Returning of the valve 210 supplies fluid via a conduit 214 to retract the stuffer control cylinder 148. When the stuffer control cylinder 148 has completely retracted, it activates a lever pilot valve 209 which sends a signal through a conduit 201 to return the four-way valves 192 and 202. Returning of the valve 202 sends fluid through a conduit 222 to expand the cylinder 120 and operating the heated jaw 114, thereby releasing the sealed and tucked bag valve sleeve 16. Returning of the valve 192, sends fluid through a conduit, 218 to contract the rod of the cylinder 106 and return the sealing head outer frame structure 121 to its horizontal position as shown in FIGS. 2, 3 and 7.

Upon the return of the sealing head structure 121 to the horizontal, a lever pilot valve 211 is activated sending a signal through a conduit 213 to return the four-way valve 176. Returning the four-way valve 176 sends fluid through a conduit 215 to contract the rods of the cylinders 90 and 93, and supplies fluid to the pilot valve 216. The contracting of the cylinder 90, opens the chair door allowing the filled and sealed bag 12 to drop by gravity (as shown in FIG. 7) out of the chair onto a suitable, filled bag, take-away system (not shown). Simultaneously the cylinder 93 is contracted and lowers the chair door plate 87.

Opening of the chair door activates a pilot valve 216, sending a signal through the conduit 217 to return the four-way valve 174. Returning of the four-way valve 174 sends fluid through conduit 220 to contract the rods of the cylinders 54 and 68. Contraction of the cylinder 68 pivots the linkage 72 lowering the chair on the arm 60. Contraction of the cylinder 54 pivots the arm 60 and causes the bag chair to move in the horizontal position as shown in FIG. 2. The system is now ready for the next cycle to commence when initiated by a signal from the conduit 162 of the valve bag packer 11.

Pressurized fluid for the operation of the system is supplied from a common manifold 226 which feeds (8) eight different fluid supply conduits 228, 230, 232, 234, 236, 240 and 242. These conduits supply the four-way valves with actuating fluid and supply the various other components of the system. Single impulse control valves 246 are provided in the fluid conduits supplying the return side of the valves 174, 176, 192 and 202, while similar, single impulse valves 248 and provided on the activation side of the four-way valves 192, 198 and 210. Manually operated service valves 164, 190 and 206 are provided to enable adjustments and servicing of sealer and controls.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. In combination with a valve bag of the type having a hollow, collapsable tubular filling sleeve at the upper end portion extending laterally outward of a body portion of said bag having an open outer end and adapted to support said bag during a filling operation with said sleeve in an open generally horizontal position;

a valve bag packer including an elongated, generally horizontal, filling tube supported in cantilevered relation at an inner end and having a free outer end portion adapted to be received in said filling sleeve of said valve bag for supporting said bag during said filling operation, said filling tube including a hollow flow passage receiving a measured amount of material at said inner end and extending through said tube to an outlet adjacent said free outer end portion for discharge of said material downwardly into said valve bag supported thereon, said filling tube having a generaly elliptical, transverse cross-section and arranged with a major axis of said elliptical cross-section generally horizontally and a minor axis of said elliptical cross-section generally vertically, said filling tube having an enlarged upper surface engaging the filling sleeve of said bag to form a maximum supportive area during the filling of said bag on said tube whereby said filling sleeve of said bag is maintained with a horizontal transverse dimension greater than a vertical transverse dimension so that said sleeve tends to return to a flattened closed condition after filling said bag and removal from said filling tube of said packer.

2. The improvement of claim 1, wherein said material flow passage is of circular cross-section centrally disposed along a longitudinal axis of said tube.

3. The improvement of claim 2 wherein said filling tube includes at least one vacuum conduit disposed along side of said material flow passage, said vacuum conduit having an inlet opening adjacent the outlet end of said material flow passage for removing any airborne material from the valve sleeve of said bag on said filling tube.

4. The improvement of claim 3 wherein said filling tube is rounded at its outer end and is formed with an outer end surface sloping inwardly and downwardly toward said packer.

5. The improvement of claim 4 wherein said outlet end of said material flow passage and said inlet of said vacuum conduit terminate on said sloping end surface.

* * * * *